US008439308B2

(12) United States Patent
Armstrong et al.

(10) Patent No.: US 8,439,308 B2
(45) Date of Patent: May 14, 2013

(54) SPRING LOADED PRESSURE RELIEF DOOR

(75) Inventors: Michael E. Armstrong, Kent, WA (US);
Michael D. Jones, Kirland, WA (US);
Kent W. Dunstan, Federal Way, WA (US)

(73) Assignee: The Boeing Company, Chicago, IL (US)

(*) Notice: Subject to any disclaimer, the term of this patent is extended or adjusted under 35 U.S.C. 154(b) by 75 days.

(21) Appl. No.: 12/927,659

(22) Filed: Nov. 19, 2010

(65) Prior Publication Data
US 2012/0125010 A1    May 24, 2012

(51) Int. Cl.
*F16P 7/00*    (2006.01)
*B64D 33/00*    (2006.01)
*F24F 11/02*    (2006.01)

(52) U.S. Cl.
USPC ......... 244/129.4; 244/53 R; 454/70; 454/340; 60/39.1; 49/141

(58) Field of Classification Search .................. 244/29.4, 244/129.5, 53 R, 129.4; 454/70, 238, 340, 454/255; 292/92, 93; 60/223, 39.83, 39.1, 60/200.1, 226.1; 49/141
See application file for complete search history.

(56) References Cited

U.S. PATENT DOCUMENTS

| 3,571,977 | A |  | 3/1971 | Abeel |
| 4,232,513 | A |  | 11/1980 | Pearson et al. |
| 4,825,644 | A |  | 5/1989 | Bubello et al. |
| 5,284,012 | A | * | 2/1994 | Laborie et al. ............... 60/39.08 |
| 5,351,476 | A | * | 10/1994 | Laborie et al. ................... 60/785 |
| 5,623,820 | A |  | 4/1997 | Balzer et al. |
| 5,765,883 | A |  | 6/1998 | Dessenberger et al. |
| 5,967,099 | A | * | 10/1999 | Patrick .......................... 123/1 A |
| 7,204,472 | B2 | * | 4/2007 | Jones et al. .............. 251/129.06 |
| 2005/0199845 | A1 | * | 9/2005 | Jones et al. .............. 251/129.06 |

* cited by examiner

*Primary Examiner* — Joseph W Sanderson
(74) *Attorney, Agent, or Firm* — Armstrong Teasdale LLP

(57) ABSTRACT

A pressure relief apparatus for an engine compartment having a wall and an opening in the wall is provided. The pressure relief apparatus includes a door panel arranged in blocking relationship to the opening in the wall of the engine compartment, a plurality of hinges coupling the door panel to an inner surface of the wall of the engine compartment, a spring assembly coupled between each hinge and the inner surface of the wall, wherein the spring assembly includes a canister having an open end and a spring element housed within the canister, and a support fitting mounted to the engine compartment wall and having a portion extending toward the open end of the canister for applying a compressive force on the spring element.

19 Claims, 4 Drawing Sheets

SPRING LOADED PRESSURE RELIEF DOOR

FIELD OF THE DISCLOSURE

The present disclosure relates generally to the field of turbine engines, and more particularly to a nacelle cowl arrangement that permits engine transient bleed air to be released from within an engine housing when pressure exceeds a predetermined threshold.

Aircraft manufacturers are under continual pressure to reduce the noise produced by aircraft in order to satisfy increasingly stringent noise certification rules. Aircraft engines are a major contributor to overall aircraft noise. Aircraft engines have been made significantly quieter as a result of advanced high bypass ratio engines. These engines derive a significant fraction of their total thrust not directly from jet exhaust, but from bypass air which is propelled around the core of the engine by an engine-driven forwardly mounted fan.

It is well-known in the art that it is necessary to operate gas turbine engines close to the engine's surge line in order to transition from one steady-state mode of operation to another as quickly as possible. Excursions beyond the surge line cannot be tolerated inasmuch as surge can result in sudden thrust loss and/or engine over-temperature. Typically, engine controls monitor various engine parameters and include schedules of engine parameters which are used to automatically control the engine, accounting for the surge characteristics of the particular engine (with an adequate safety factor) for which the control is designed. During steady-state engine operation, it is known to modulate the compressor bleed valve in accordance with a particular schedule based on such parameters as altitude, Mach number and engine power level. During transient engine operation the steady-state bleed valve position is reset more open by an amount which is a function of the ratio of actual rate of speed change of the compressor to a maximum scheduled rate of speed change of the compressor, biased to account for engine speed (i.e., power level). The closer the actual rate of change is to the scheduled maximum rate of change, the more the bleed is opened. The closer the compressor operating line is to the stall line, the better the engine performance.

In order to satisfy engine noise requirements, it has been found necessary to use an engine transient bleed exhaust system. One known arrangement employs a thrust reverser cowling design that, as a result of the additional pressure created by the engine bleed system, necessitates trigger latch pressure relief doors to pop open during normal operation. Such an event that is not acceptable. Another proposed solution involves adding a large vent in the cowling, However, doing so would negatively impact engine performance due to aerodynamic drag in the fan stream. Still another proposed solution involves increasing the pressure needed to pop open the existing trigger latch pressure relief doors, but this would require strengthening the cowling to withstand increased pressure loads, which in turn would increase the cowling weight.

It would therefore be of great value to find a more viable way to relieve engine transient bleed valve exhaust pressure that avoids the aforementioned drawbacks and deficiencies of known solutions.

SUMMARY OF THE DISCLOSURE

In one aspect of the disclosure, a pressure relief apparatus for an engine compartment having a wall and an opening in the wall includes a door panel arranged in blocking relationship to the opening in the wall of the engine compartment, a plurality of hinges coupling the door panel to an inner surface of the wall of the engine compartment, a spring assembly coupled between each hinge and the inner surface of the wall, wherein the spring assembly includes a canister, and a spring element housed within the canister, and a support fitting having a portion in the canister for applying a compressive force on the spring element.

In another aspect of the disclosure, a pressure relief apparatus for an engine compartment having a wall and an opening in the wall, includes a door panel arranged in blocking relationship to the opening in the wall of the engine compartment, a plurality of hinges coupling the door panel to an inner surface of the wall of the engine compartment, a spring assembly coupled between each hinge and the inner surface of the wall, wherein the spring assembly includes a canister, and a spring element housed within the canister, and a support fitting mounted to the engine compartment wall and having a portion extending toward the open end of the canister for applying a compressive force on the spring element.

In one variation of the disclosure, the spring element has one end portion communicating with the open end of the canister, and the support fitting portion is positioned against the one end of the spring element.

In another variation of the disclosure, the canister is pivotally mounted to the hinge between end portions thereof and the support fitting associated with each hinge includes a crossbar located adjacent the canister, an end portion of the spring assembly proximate the canister open end being operatively coupled with the crossbar of the support fitting to cause a pre-load compressive force to be exerted on the spring element in advance of any movement of the door panel into or out of the engine compartment wall opening.

In another variation of the disclosure, Ti-6-2-4-2 is the metal material used for the door panel, the hinges, and the support fitting, and the spring element is made from Nickel alloy 718.

In yet another variation, the canister includes an end cap opposite the canister open end, the canister defining an axis of compression along which the spring element is compressed, the hinge comprises an elongated hinge element having one end portion attached to the door panel and an opposing end portion pivotally mounted to the engine compartment wall, the hinge element carrying between the end portions at least one laterally extending member, and the end cap of the canister is pivotally mounted to one laterally extending member, whereby as the door panel opens and closes, the crossbar of the spring support fitting moves into and out of the canister open end thereby applying and removing a compressive force on the spring element in the canister.

In still another variation of the disclosure, the laterally extending member defines a first pivot axis and the hinge defines a second pivot axis positioned further away from the crossbar of the support fitting than the first pivot axis.

In still another variation of the disclosure, when the door panel opens, the distance between the axis of compression of the canister and the second pivot axis decreases thereby compressing the spring element in the canister.

In still another variation of the disclosure, as the door panel closes, the distance between the axis of compression and the second pivot axis increases so that the compressive force on the spring element is relieved.

In yet another variation of the disclosure, as the door panel opens, the distance between the axis of compression of the canister and the second pivot axis decreases thereby compressing the spring element in the canister, and as the door panel closes, the distance between the axis of compression and the second pivot axis increases so that the compressive force on the spring element is relieved, whereby a near constant opening and closing force controls the motion of the door panel throughout the entire range of motion of the door panel.

In yet another variation of the disclosure, the spring element is entirely housed within the canister and the canister shields the spring element from impingement of hot gases from the engine operating inside the engine compartment when the door panel is closed, thereby increasing the durability of the spring element.

In yet another variation of the disclosure, slots are provided in diametrically opposed sides of the canister in the vicinity of the canister open end, and a spring retainer supports stop pins that fit in and ride along the slots, the slots having a finite axial extent so that when the door panel opens it is prevented from hitting structural parts located outside the engine compartment.

In another variation of the disclosure, the canister includes small lock out holes proximate the open end that permit insertion of a rod to hold the spring element in compression so that the spring element or the spring assembly can be removed In still another variation of the disclosure, the hinge element carries between its end portions two laterally extending members, and the spring assembly includes two canisters, each having an open end and housing its own spring element, and the crossbar of the support fitting is positioned adjacent to, and is operatively coupled with, the open ends of both of said canisters.

In yet another variation of the disclosure, the two laterally extending members project to opposite sides of the hinge element and are co-extensive.

In still another variation of the disclosure, a method of relieving excessive pressure within an engine compartment by opening and closing a pressure relief door blocking an opening in an engine compartment comprises the steps of mounting the pressure relief door on the wall in blocking relationship to the opening, pivotally securing the door to an inner surface of the engine compartment so that the door opens outwardly of the engine compartment when pressure in the engine compartment exceeds a threshold amount, attaching a spring between the door and the inner surface of the engine compartment so that the spring holds the door in a first position wherein the opening is closed, and compressing the spring by a threshold amount such that the door will move away from the opening only when the pressure in the engine compartment exceeds the threshold force.

One variation of the method entails a further step of enclosing the spring within a canister so that the spring will be protected from corrosive exhaust gases.

Another variation of the method includes the steps of providing a pivot between the door and the inner surface of the engine compartment, and arranging the spring relative to the pivot such that as the door opens, the distance between the spring axis of compression and the pivot decreases thereby compressing the spring element, and as the door closes, the distance between the spring axis of compression and the pivot increases so that the compressive force on the spring element is relieved, whereby a near constant opening and closing force controls the motion of the door throughout the entire range of motion of the door.

Still another aspect of the disclosure entails an apparatus for relieving excessive pressure within an engine compartment by moving a pressure relief door from a first position blocking an opening in an engine compartment to at least one other position in which the opening is unblocked and excessive pressure in the engine compartment is relieved, the apparatus comprising a pair of first brackets mounted to a wall of the engine compartment proximate the opening, each first bracket including a pivot, a gooseneck hinge mounted between the pivot and the door, wherein the pivot enables movement of the door into and out of blocking relationship with the opening, and a spring assembly including a spring element having a first region attached to and carried by a respective gooseneck hinge, and a pair of second brackets mounted to the engine compartment wall and each having a portion bearing against and applying a threshold compressive force to the respective spring element, the threshold force acting to hold the door in its first position until the pressure in the engine compartment exceeds the threshold force, whereupon when the pressure in the engine compartment becomes excessive and the threshold force is overcome, the door opens outwardly of the engine compartment to one of its at least one other positions against the force of the respective spring element.

One variation of the apparatus includes the spring assembly further including a container housing the spring element and protecting it from corrosive exhaust gases within the engine compartment, and the portion of the second brackets applying a threshold force against the respective spring element engages a second region removed from the first region. Another variation of the apparatus entails the engine compartment containing an aircraft turbine.

Further aspects of the inspection apparatus and the method of using the apparatus are disclosed herein. The features as discussed above, as well as other features and advantages of the present disclosure will be appreciated and understood by those skilled in the art from the following detailed description and drawings.

DETAILED DESCRIPTION OF THE DISCLOSURE

Embodiments of the present disclosure now will be described more fully hereinafter with reference to the accompanying drawings. However, many different embodiments are contemplated and the present disclosure should not be construed as limited to the embodiments set forth herein; rather, these embodiments are provided so that this disclosure will be thorough and complete and better convey the scope of the disclosure to those skilled in the art.

In its broadest sense, this disclosure presents a pressure relief mechanism including a door for opening an engine compartment subject to a variable pressure environment, where the pressure relief mechanism is actuated when the pressure exceeds a predetermined threshold, and the force for opening or closing the door is substantially constant throughout its entire range of motion.

The present disclosure further encompasses a structural arrangement for relieving high levels of pressure in a vehicle engine compartment resulting from a build-up, or a sudden spike, in engine bleed air pressure that exceeds a predetermined threshold amount, without adding significant weight to the vehicle.

Figure 1A:
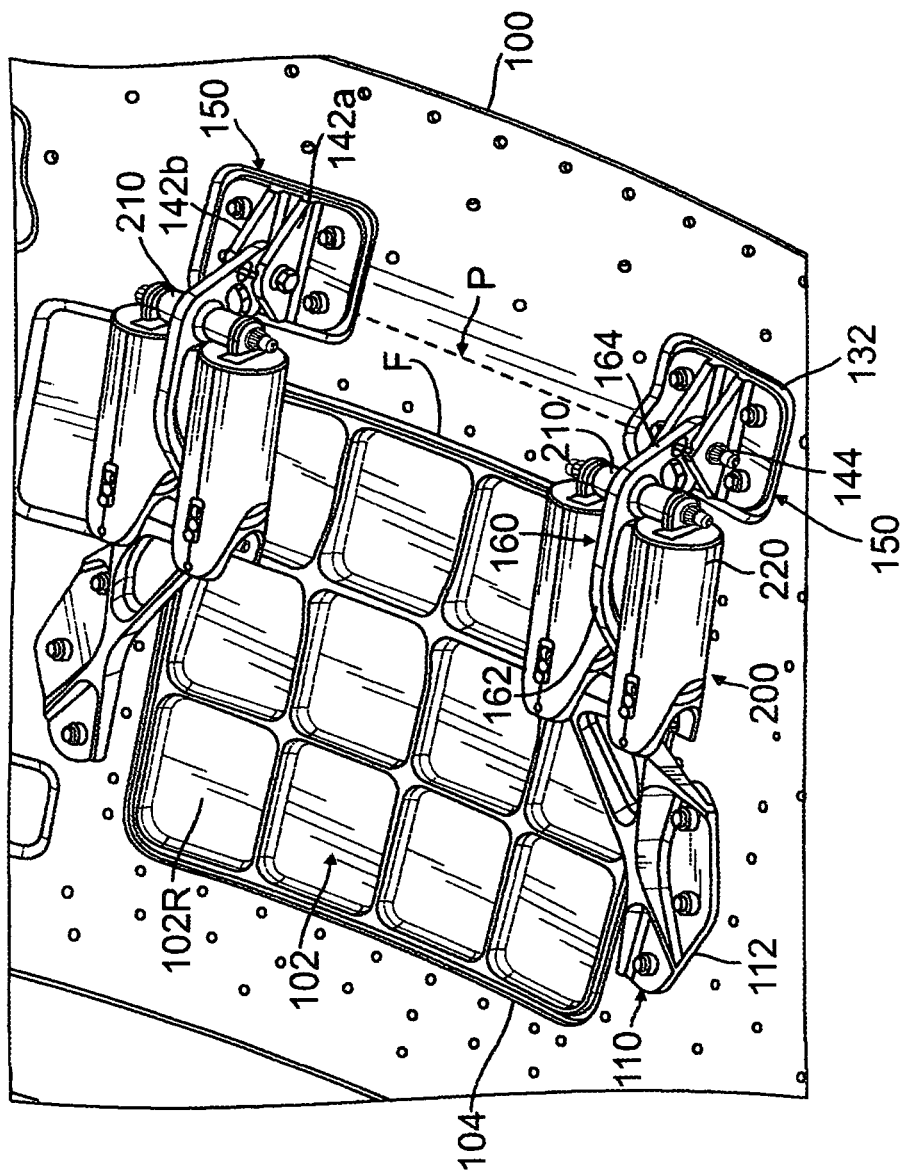
FIG. 1A is a perspective view of a door panel assembly in accordance with the present disclosure.
Figure 1B:
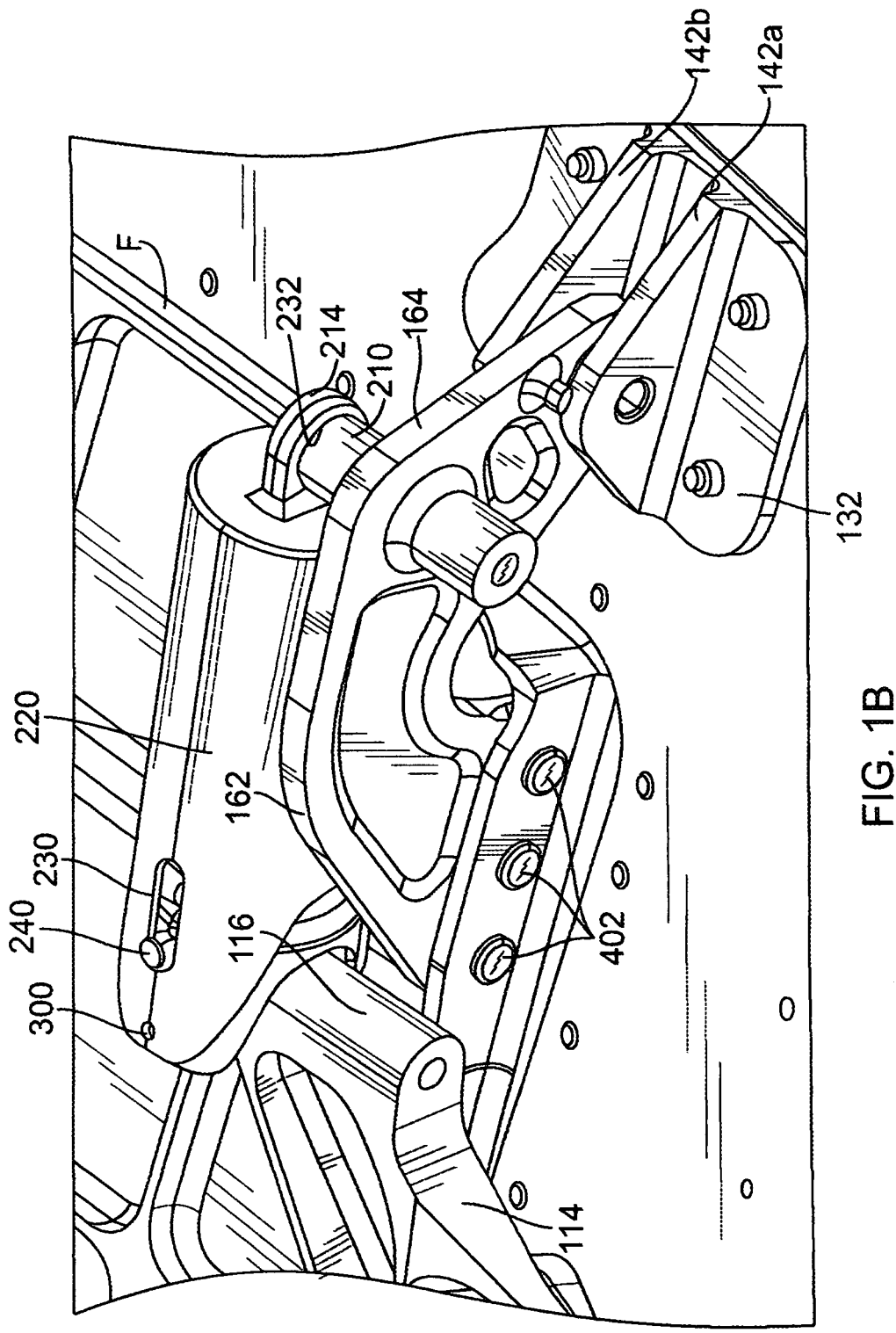
FIG. 1B is an enlarged perspective view of the portion of the door panel assembly in the encircled area B-B shown in FIG. 1A, with part of the spring assembly structure removed.

FIG. 1A is a view of the interior surface of the wall of an engine compartment or enclosure 100 showing a door panel 102 mounted in an opening 104 in the engine compartment wall. The opening may be slightly larger than the panel, and may include a seal (not shown) disposed about the periphery of the opening or the door panel. Hinge assemblies 150 each include a hinge element 160 mounted at a forward portion to the wall of the engine compartment adjacent the opening (more on this below) and a second portion secured to a forward portion of the door panel via fasteners 402 (see FIG. 1B). As a result of this arrangement, the door panel 102 is able to pivot about a pivot axis P in a downward direction from a first "closed" position in the opening 104 (as shown in FIG. 1A) to a second "open" position in which the door panel is disposed outwardly from the opening and away from the interior wall of the engine compartment. That is, as seen in FIG. 1A, the rearward portion 102R of the door panel 102 moves downward from the plane of the engine compartment wall when the door panel moves from the closed position as shown in FIG. 1A to an open position.

Although FIG. 1A depicts two hinge assemblies that secure the door panel to the engine compartment wall, it is to be understood that the disclosure contemplates the use of one or more hinge assemblies to secure the door panel 102, depending on the size and weight of the door panel as well as the magnitude of force of engine bleed pressure that could be developed.

The following is a description of one of the hinge assemblies pivotally securing the door panel 102 to the engine compartment wall, since all hinge assemblies securing the door panel to the engine compartment wall are essentially identical in configuration and constituent elements. Therefore, it will only be necessary to describe one of the hinge assemblies in the following paragraphs.

Referring to FIGS. 1A, 1B, 2 and 3, it can be seen that each hinge assembly includes a support fitting 110 mounted to the interior surface of the engine compartment wall. The support fitting includes a first, rearwardly extending, portion 112 secured to the engine compartment wall at one side of the opening 104, and a second, forwardly extending, portion 114 that terminates in a crossbar 116 arranged substantially parallel to the forward wall F of the opening 104. Also mounted to the interior surface of the engine compartment wall are clevis fittings 132. The clevis fittings are secured to the engine compartment wall forwardly and laterally of the opening 104 and are aligned forwardly of and in line with the support fittings 110. Each clevis fitting 132 includes a pair of parallel clevis arms 142a, 142b and a clevis pin 144 spanning the arms. Extending between each clevis pin and the door panel is a gooseneck hinge element 160, the latter having a rearwardly extending nose portion 162 attached to a forward portion of the door panel and a forwardly extending heel portion 164 which is disposed between the pair of parallel clevis arms 142a, 142b. The gooseneck hinge element 160 is pivotally secured to the clevis pin 144.

Each hinge assembly 150 includes a spring assembly 200 mounted between the crossbar 116 of the support fitting and a spring assembly pivot bar 210 secured to the gooseneck hinge element rearwardly of the clevis pin and extending laterally, and on opposite sides, of the gooseneck hinge element. The spring assembly 200 includes one or more cylindrical spring housings or canisters 220 extending rearwardly from the clevis fitting; as seen in FIG. 1, one spring canister is supported on each side of the gooseneck hinge element. It is to be understood, however, that the present disclosure also contemplates an arrangement in which both of the spring canisters are located on the same side of the gooseneck hinge element. The forward end of each canister includes an end cap 212 having a lug 214. The lug includes a through-hole 232 that allows the lug to be pivotally secured to the pivot bar 210. The rearward end of the canister is open for receipt of a cylindrical compression spring element 222 that is to be housed within each spring canister 220.

Figure 2:
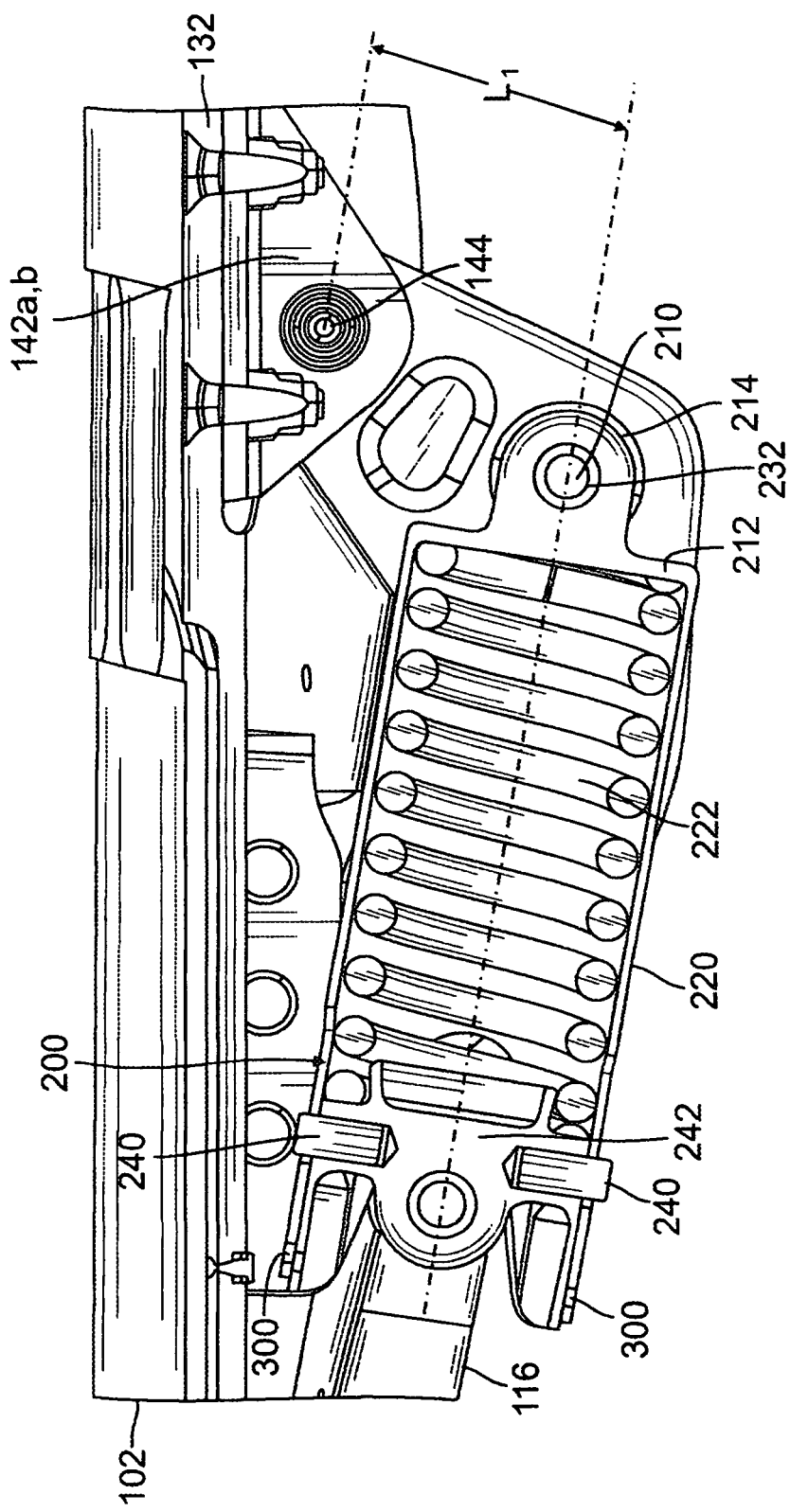
FIG. 2 is a cross-sectional view of the spring assembly coupled to the door panel depicted in FIG. 1A in which the door panel is in a closed position.

FIG. 2 shows the spring element 222 held in its respective canister 220, in a slightly compressed state, by the forward end of a piston element 242, which slides in the canister and is pivotally secured to the crossbar 116. This arrangement imposes a preload force on the spring element 222 which ensures that the door panel will not be forced open during normal engine operation, as it is known that a certain level of pressure within the engine compartment during engine operation is always present under normal conditions. Furthermore, the piston element acts to contain and stabilize the compression spring element 222 while it (the spring element) is housed within the canister 220. The canister also shields the spring element 222 from the hot engine bleed gases, which extends the useful life of the spring element. The through-hole 232 of the lug 214 facilitates pivoting motion of the spring assembly relative to the gooseneck hinge element 160 so that as the gooseneck hinge element pivots relative to the clevis fitting when the door panel opens and closes, its motion is damped by the spring element 222.

The rearward end of each canister has diametrically opposed slots 230 in the outer wall of the canister extending in a forward direction along the longitudinal extent of the canister. Two stop pins 240 are inserted into diametrically arranged holes 242 in the piston element. The holes extend normal to the longitudinal extent of the canister. The stop pins are inserted through the holes and into the piston element after the spring element is placed in its respective canister thus producing a piston assembly. The stop pins ride in and are guided by the canister slots 230 in the cylinder circumferential wall as the door panel opens and the spring compresses. The stop pins function to prevent the door panel from opening too far as well as to hold the spring in a preloaded state within the spring assembly prior to installation.

Diametrically opposed installation and removal holes 300 are formed adjacent the rearmost portion of the canister circumferential wall behind the slots 230 and through the rearward end of the piston. The installation and removal holes permit installation and/removal of the spring element 222 from the spring assembly canister. In putting the spring assembly together, the spring element is first inserted into the canister. Then the piston element is inserted into the canister against the rearward end of the spring element. The spring element is forced into a state of "slight compression" and can be temporarily held in that position of "slight compression" with a rod (not shown) that is inserted into the installation and/removal holes 300 just prior to insertion or removal of the stop pins into or from the piston element holes 242. When it is desired to remove the spring element from the canister, or the spring assembly from its connection with the gooseneck hinge element, a rod is inserted into the installation and/removal holes, whereupon the preload on the spring element is released so the spring assemblies can be safely installed or/removed.

Figure 3:
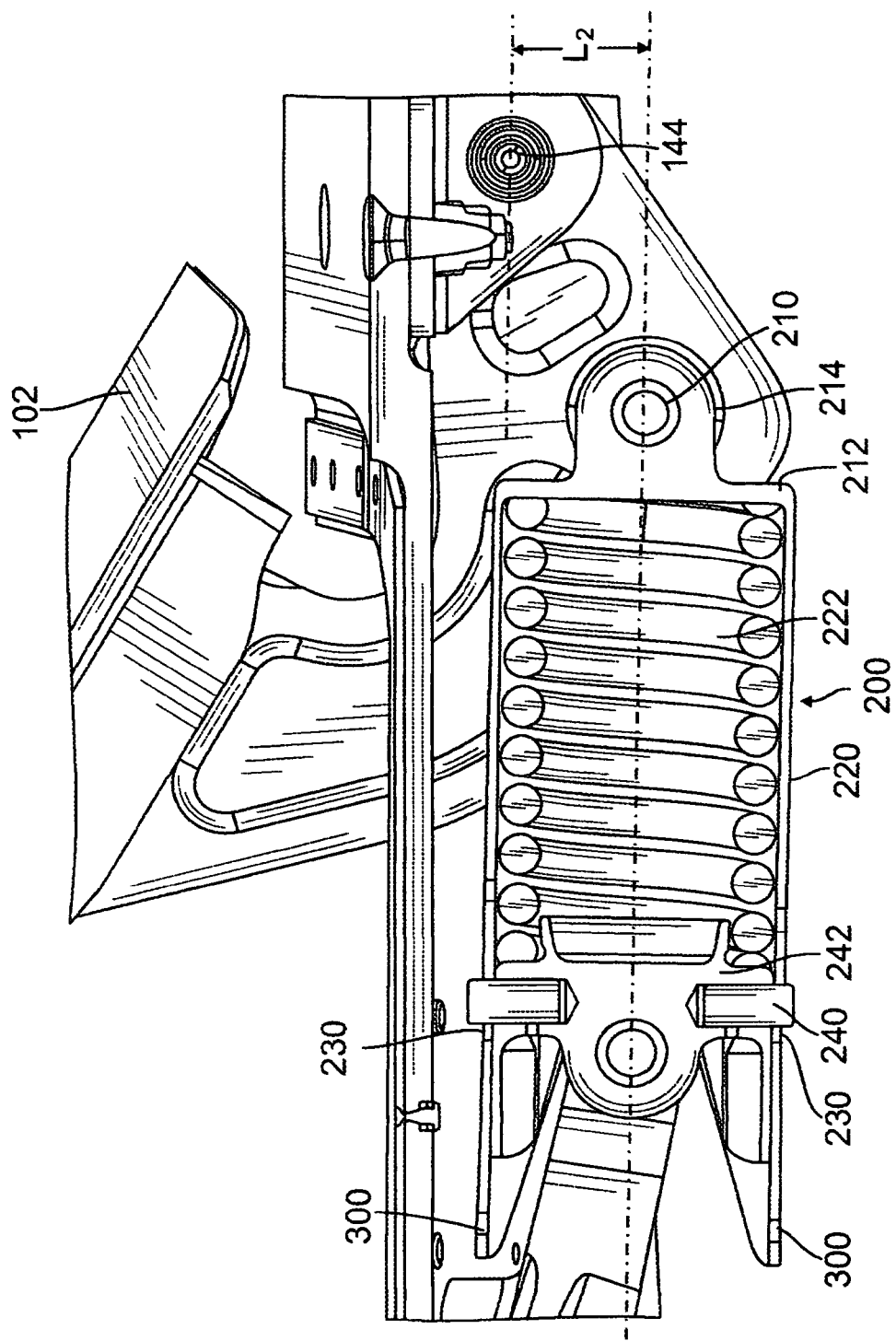
FIG. 3 is a cross-sectional view of the spring assembly coupled to the door panel depicted in FIG. 1A in which the door panel is in an open position

FIG. 3 shows the door panel 102 in an open position relative to the opening 104 in the engine compartment wall opening. As a result of engine compartment pressure exceeding the pre-set threshold spring force, the spring element 222 in the canister continues to be compressed as the door panel moves from its initial position where it blocks opening 104 to a fully open door panel position. When the engine compartment pressure returns to a value below the pre-set threshold value, the spring force will return the door panel to the closed position.

FIGS. 2 and 3 also depict how the geometry of the spring assembly creates a near constant opening or closing force throughout the entire range of motion of the door panel, and aids in relieving under cowl pressure during a burst duct or engine bleed exhaust. The distance between the longitudinal axis of the spring canister and the hinge pivot 144 changes from a maximum distance of L1 (FIG. 2) when the door panel is closed and blocking the opening 104, to a minimum distance of L2 (FIG. 3) when the door panel is open. At L1, the spring force is at a minimum, whereas at L2, the spring force is at its maximum.

Preferably, the door panel, the hinges, and the spring assembly components are fabricated from titanium alloy Ti-6-2-4-2, and the spring itself is made from nickel alloy 718 or nickel alloy 625.

While the disclosure has been made with reference to a preferred embodiment, it will be understood by those skilled in the art that various changes may be made and equivalents may be substituted for elements thereof without departing from the scope of this disclosure.

The invention claimed is:

1. A pressure relief apparatus for an engine compartment having a wall and an opening in the wall, comprising:
   a door panel arranged in blocking relationship to the opening in the wall of the engine compartment,
   a plurality of hinges mounted to an inner surface of the wall for coupling the door panel to the inner surface of the wall of the engine compartment,
   a spring assembly coupled to each hinge, wherein the spring assembly includes a canister having an open end and a spring element housed within the canister, and
   a support fitting mounted to the inner surface of the wall and having a portion extending toward the open end of the canister for applying a compressive force on the spring element, wherein the spring assembly is coupled between the hinge and the support fitting, wherein the spring element has one end portion communicating with the open end of the canister, and the support fitting portion is positioned against the one end portion of the spring element.

2. The pressure relief apparatus of claim 1, wherein the canister is pivotally mounted to the hinge between end portions thereof, and the support fitting associated with each hinge includes a crossbar located adjacent the canister, an end portion of the spring assembly proximate the canister open end being operatively coupled with the crossbar of the support fitting to cause a preload compressive force to be exerted on the spring element in advance of any movement of the door panel into or out of the engine compartment wall opening.

3. The pressure relief apparatus of claim 1, wherein Ti-6-2-4-2 is the metal material used for the door panel, the hinges, and the support fitting, and the spring element is made from Nickel alloy 718.

4. The pressure relief apparatus of claim 1, wherein
   the canister includes an end cap opposite the canister open end, the canister defining an axis of compression along which the spring element is compressed,
   the hinge comprises an elongated hinge element having one end portion attached to the door panel and an opposing end portion pivotally mounted to the engine compartment wall, the hinge element carrying between the end portions at least one laterally extending member, and
   the end cap of the canister is pivotally mounted to one laterally extending member of the at least one laterally extending member,
   whereby as the door panel opens and closes, a crossbar of the support fitting moves into and out of the canister open end thereby applying and removing a compressive force on the spring element in the canister.

5. The pressure relief apparatus of claim 4, wherein the laterally extending member defines a first pivot axis and the hinge defines a second pivot axis positioned further away from the crossbar of the support fitting than the first pivot axis.

6. The pressure relief apparatus of claim 5, wherein when the door panel opens, the distance between the axis of compression of the canister and the second pivot axis decreases thereby compressing the spring element in the canister.

7. The pressure relief apparatus of claim 5, wherein as the door panel closes, the distance between the axis of compression and the second pivot axis increases so that the compressive force on the spring element is relieved.

8. The pressure relief apparatus of claim 4, wherein as the door panel opens, the distance between the axis of compression of the canister and the second pivot axis decreases thereby compressing the spring element in the canister, and as the door panel closes, the distance between the axis of compression and the second pivot axis increases so that the compressive force on the spring element is relieved, whereby a near constant opening and closing force controls the motion of the door panel throughout the entire range of motion of the door panel.

9. The pressure relief apparatus of claim 4, wherein the hinge element carries between its end portions two laterally extending members, and the spring assembly includes two canisters, each having an open end and housing its own spring element, and the crossbar of the support fitting is positioned adjacent to, and is operatively coupled with, the open ends of both of said canisters.

10. The pressure relief apparatus of claim 9, wherein the two laterally extending members project to opposite sides of the hinge element and are co-extensive.

11. The pressure relief apparatus of claim 1, wherein the spring element is entirely housed within the canister and the canister shields the spring element from impingement of hot gases from the engine operating inside the engine compartment when the door panel is closed, thereby increasing the durability of the spring element.

12. The pressure relief apparatus of claim 1, wherein slots are provided in diametrically opposed sides of the canister in the vicinity of the canister open end, and a spring retainer supports stop pins that fit in and ride along the slots, the slots having a finite axial extent so that when the door panel opens it is prevented from hitting structural parts located outside the engine compartment.

13. The pressure relief apparatus of claim 1, wherein the canister includes small lock out holes proximate the open end that permit insertion of a rod to hold the spring element in compression so that the spring element or the spring assembly can be removed.

14. The pressure relief apparatus of claim 1, wherein the engine compartment encloses one of an aircraft turbine or an automobile engine.

15. A method of relieving excessive pressure within an engine compartment by opening and closing a pressure relief door blocking an opening in an engine compartment, comprising the steps of:

mounting the pressure relief door on the wall in blocking relationship to the opening,
pivotally securing the door to an inner surface of the engine compartment with a plurality of hinges mounted to the inner surface such that the door opens outwardly of the engine compartment when pressure in the engine compartment exceeds a threshold amount,
attaching a spring between each hinge and a support fitting mounted to the inner surface of the engine compartment so that the spring holds the door in a first position wherein the opening is closed,
compressing the spring by a threshold amount such that the door will move away from the opening only when the pressure in the engine compartment exceeds the threshold force,
providing a pivot between the door and the inner surface of the engine compartment, and
arranging the spring relative to the pivot such that as the door opens, the distance between the spring axis of compression and the pivot decreases thereby compressing the spring element, and as the door closes, the distance between the spring axis of compression and the pivot increases so that the compressive force on the spring element is relieved, whereby a substantially constant opening and closing force controls the motion of the door throughout the entire range of motion of the door.

16. The method of claim 15, and further including the step of enclosing the spring within a canister so that the spring will be protected from corrosive exhaust gases.

17. An apparatus for relieving excessive pressure within an engine compartment by moving a pressure relief door from a first position blocking an opening in an engine compartment to at least one other position in which the opening is unblocked and excessive pressure in the engine compartment is relieved, the apparatus comprising:
a pair of first brackets mounted to a wall of the engine compartment proximate the opening, each first bracket including
a pivot,
a gooseneck hinge mounted between the pivot and the door, wherein the pivot enables movement of the door into and out of blocking relationship with the opening, and
a spring assembly including a spring element having a first region attached to and carried by a respective gooseneck hinge, and
a pair of second brackets mounted to the engine compartment wall and each having a portion bearing against and applying a threshold compressive force to the respective spring element, the threshold force acting to hold the door in its first position until the pressure in the engine compartment exceeds the threshold force,
whereupon when the pressure in the engine compartment becomes excessive and the threshold force is overcome, the door opens outwardly of the engine compartment to one of its at least one other positions against the force of the respective spring element.

18. The apparatus of claim 17, wherein said spring assembly further includes a container housing the spring element and protecting it from corrosive exhaust gases within the engine compartment, and the portion of the second brackets applying a threshold force against the respective spring element engages a second region removed from the first region.

19. The apparatus of claim 18, wherein the engine compartment contains an aircraft turbine.

\* \* \* \* \*